(12) United States Patent
Burrow et al.

(10) Patent No.: US 9,520,706 B2
(45) Date of Patent: Dec. 13, 2016

(54) DOWNHOLE CABLE TERMINATION SYSTEMS

(71) Applicant: SIEMENS AKTIENGESELLSCHAFT, München (DE)

(72) Inventors: Christopher Burrow, Ulverston (GB); Mark Simmonds, Ulverston (GB)

(73) Assignee: Siemens Aktiengesellschaft, München (DE)

( * ) Notice: Subject to any disclaimer, the term of this patent is extended or adjusted under 35 U.S.C. 154(b) by 4 days.

(21) Appl. No.: 14/433,647

(22) PCT Filed: Jul. 30, 2013

(86) PCT No.: PCT/EP2013/065967
§ 371 (c)(1),
(2) Date: Apr. 4, 2015

(87) PCT Pub. No.: WO2014/053257
PCT Pub. Date: Apr. 10, 2014

(65) Prior Publication Data
US 2015/0325997 A1   Nov. 12, 2015

Related U.S. Application Data

(60) Provisional application No. 61/709,498, filed on Oct. 4, 2012.

(30) Foreign Application Priority Data

Oct. 4, 2012 (GB) .................................. 1217789.5

(51) Int. Cl.
*H01R 4/60* (2006.01)
*H01R 4/64* (2006.01)
(Continued)

(52) U.S. Cl.
CPC ............ *H02G 15/22* (2013.01); *H01R 13/523* (2013.01); *H02G 1/145* (2013.01); *H02G 15/013* (2013.01); *Y10T 29/49178* (2015.01)

(58) Field of Classification Search
CPC ...... H02G 15/22; H02G 15/013; H02G 1/145; H02G 1/14; H01R 13/523; Y10T 29/49178
(Continued)

(56) References Cited

U.S. PATENT DOCUMENTS 5,833,490 A   11/1998   Bouldin
6,095,838 A    8/2000   Brickett
(Continued)

FOREIGN PATENT DOCUMENTS

WO   WO2012038665 A1   3/2012

OTHER PUBLICATIONS

National Receipt Search Report dated Jan. 31, 2013 for corresponding application GB 1217789.5.
(Continued)

*Primary Examiner* — Javaid Nasri
(74) *Attorney, Agent, or Firm* — Lempia Summerfield Katz LLC

(57) ABSTRACT

Downhole cable termination apparatus for terminating a cable that is to extend into a downhole environment from a tubing hanger to electrical equipment, the apparatus including: an electrical contact for electrical engagement with a conductor of the cable to form a termination, which, in use, is to be electrically insulated by an insulating portion; and a housing defining a chamber for receiving the insulating portion and in which the internal pressure is isolated from pressure in the downhole environment.

18 Claims, 2 Drawing Sheets

(51) Int. Cl.
*H02G 15/22* (2006.01)
*H02G 15/013* (2006.01)
*H02G 1/14* (2006.01)
*H01R 13/523* (2006.01)

(58) Field of Classification Search
USPC .............................. 439/199; 174/19; 29/858
See application file for complete search history.

(56) References Cited

U.S. PATENT DOCUMENTS

2003/0228783 A1   12/2003  Cairns et al.
2009/0317997 A1   12/2009  Watson et al.
2011/0140364 A1*  6/2011   Head ....................... F16L 21/04
                                                                      277/314

OTHER PUBLICATIONS

PCT International Notification of transmittal of the International Searching Authority dated Sep. 25, 2014 for corresponding PCT/EP2013/065967.
PCT International Search Report and Written Opinion of the International Searching Authority dated Sep. 27, 2013 for corresponding PCT/EP2013/065967.

* cited by examiner

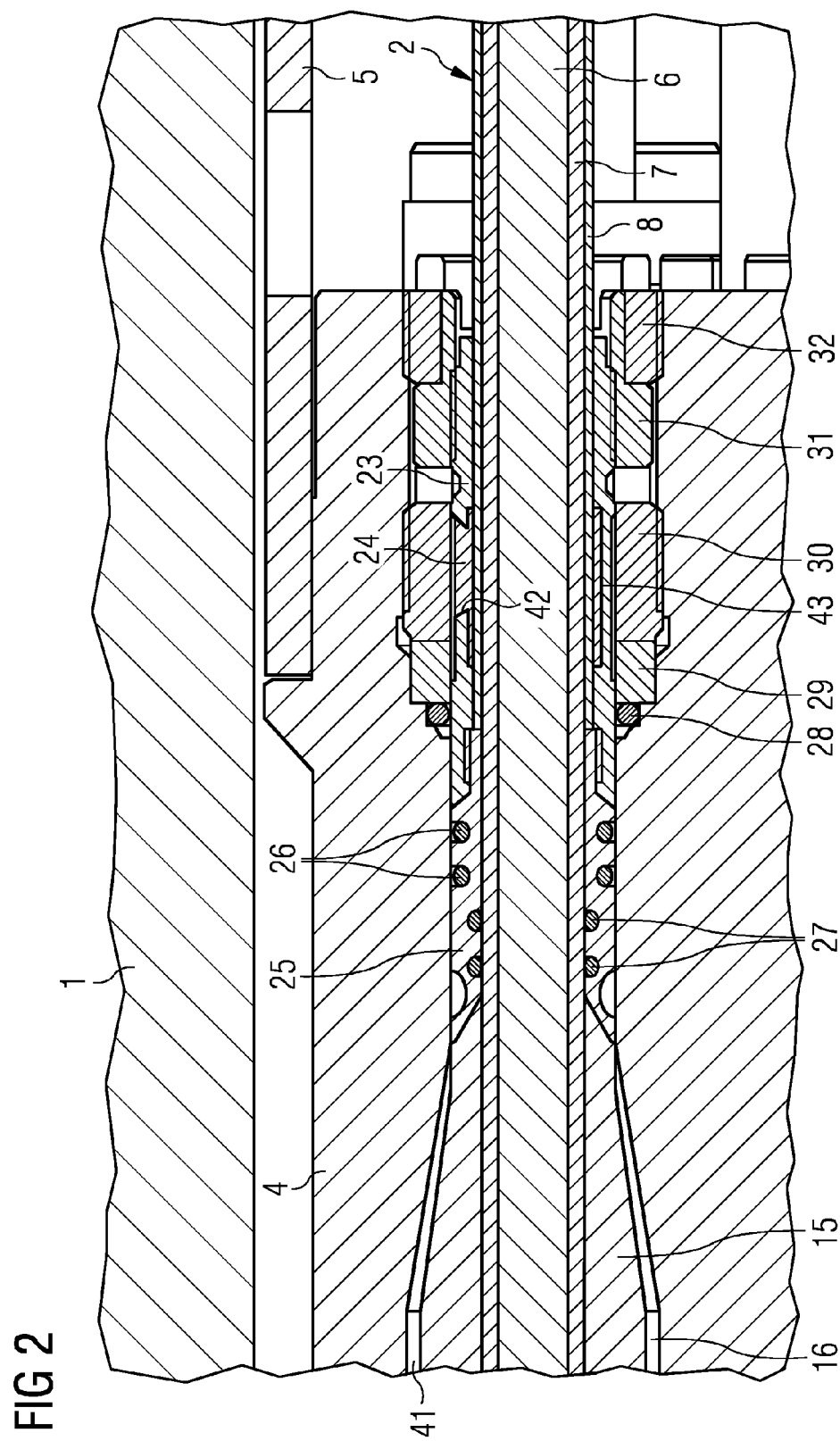

DOWNHOLE CABLE TERMINATION SYSTEMS

The present patent document is a §371 nationalization of PCT Application Serial Number PCT/EP2013/065967, filed Jun. 30, 2013, designating the United States, which is hereby incorporated by reference, and this patent document also claims the benefit of GB Application No. 1217789.5, filed Oct. 4, 2012, and U.S. Provisional Patent Application No. 61/709,498, filed Oct. 4, 2012, which are also hereby incorporated by reference.

TECHNICAL FIELD

The present embodiments relate to a downhole cable termination apparatus and more specifically an apparatus for terminating a cable that is to extend downhole into a downhole environment from a tubing hanger to electrical equipment. The embodiments also relate to downhole termination assemblies and methods of manufacturing downhole termination assemblies.

BACKGROUND

A subsea well may be provided with a tubing hanger for suspending production tubing extending into a reservoir or a dummy reservoir. The tubing hanger may also house a connector that terminates a cable extending downhole to supply power to electrical equipment such as an electric submersible pump located in the reservoir or dummy reservoir. Such connectors in the tubing hanger are subjected to hostile conditions such as extreme temperatures and pressures and aggressive chemicals and thus the connectors need to be designed to deal with these conditions.

A known system for this environment is the SpecTRON 5 (trademark) Electrical Submersible Pump (ESP) power feedthrough system produced by Tronic Limited. This system includes a connector for terminating the cable extending downhole. The termination between the cable and a pin is formed by a cable crimp between the two parts. The termination is covered by an elastomeric termination sleeve stretched over the end of the cable and connector pin. This termination is housed in a cable termination chamber sealed from the downhole environment by an elastomeric diaphragm and an elastomeric cable boot. The elastomeric diaphragm is filled with a dielectric gel. The diaphragm is flexible and may transmit pressure from the ambient environment to the connector internals to maintain a minimal pressure differential.

A first aspect is concerned with providing a downhole termination apparatus with an improved sealing arrangement between a termination of a cable and the downhole environment.

Viewed from a first aspect, in a first alternative thereof, there is provided a downhole cable termination apparatus for terminating a cable that is to extend downhole from a tubing hanger to electrical equipment, the apparatus including: an electrical contact for electrical engagement with a conductor of the cable to form a termination, which, in use, is to be electrically insulated by an insulating portion around the termination; and a seal to be located downhole from the insulating portion for sealing between the insulating portion and the downhole environment, wherein the seal is a metallic seal.

By providing an apparatus with a metallic seal to be provided downhole from the insulating portion, a path between the downhole environment and the insulating portion may be sealed by the metallic seal.

As mentioned above, the connectors in the tubing hanger are subjected to hostile conditions such as extreme temperatures and pressures and aggressive chemicals. Additionally, gases from the well rise up and sit around the connector and elastomers are prone to absorbing these gases.

The pressure in the downhole environment may fluctuate, for example, due to the operation of an electric submersible pump in the well. This pressure fluctuation may cause a problem for the elastomers having absorbed gas. A rapid drop in pressure results in the gas having permeated the elastomer rapidly expanding. The majority of the expanding gas may be absorbed into the material is unable to diffuse to accommodate the expansion and as a result the gas expansion within the material may damage and tear the material. This effect is known as rapid gas decompression (RGD).

In some prior art systems, there have been attempts to minimize the effect of rapid gas decompression by using elastomers that absorb less gas and/or by constraining the elastomers so as to prevent the gas/elastomer volume from expanding and hence preventing the elastomer from tearing. The internal pressure of the constrained elastomer will build up until the gas may diffuse out.

SUMMARY AND DESCRIPTION

The scope of the present invention is defined solely by the appended claims and is not affected to any degree by the statements within this summary. The present embodiments may obviate one or more of the drawbacks or limitations in the related art.

The problem of rapid gas decompression may be overcome in a more reliable manner by designing the connector so that elastomeric materials are not in contact with the gas in the downhole environment subject to pressure fluctuations.

In the first aspect, the insulating portion may be prevented from coming into contact with the gas fluctuating in pressure by use of a metallic seal downhole of the insulating portion. The downhole metal seal may prevent the problem of RGD occurring in the insulating portion as it provides a barrier to prevent gas coming into contact with the insulating portion that may absorb the gases. Additionally, because the metal seal is not susceptible to rapid gas decompression itself it is less likely to fail during the lifetime of the connector and therefore provides a reliable seal over the lifetime of the connector.

The seal may be arranged to be energized by being axially compressed. This feature is of independent patentable significance.

Viewed from a first aspect, in a second alternative thereof, there is provided a downhole cable termination apparatus for terminating a cable that is to extend downhole from a tubing hanger to electrical equipment, the apparatus including: an electrical contact for electrical engagement with a conductor of the cable to form a termination, which, in use, is to be electrically insulated by an insulating portion around the termination; and a seal to be located downhole from the insulating portion for sealing between the insulation portion and the downhole environment, wherein the seal is arranged to be energized by being axially compressed.

In prior art connectors, for example the SpecTRON 5 (trademark) discussed above, the termination is housed in a cable termination chamber sealed from the downhole environment by an elastomeric diaphragm and an elastomeric cable boot. The seal is provided by the elastomeric diaphragm having a lip held between an outer casing of the connector and a seal holder extending around the cable and the elastomeric cable boot extending over a portion of the seal holder and the cable. The lip of elastomeric diaphragm is energized by radial compression between the outer casing and the seal holder and the elastomeric cable boot radially grips the cable and the portion of the seal holder.

The advantage of having a seal energized by axial compression is that such an arrangement may achieve relatively high energizing force and hence is able to provide a highly effective seal.

The seal may be a metallic seal or it may be made from a material other than metal such as a polymeric material, or it may be metal and other material composite. The seal may be made from a material that is not susceptible to rapid gas decompression. By using a seal resistant to rapid gas decompression to seal the insulating portion from the downhole environment, the seal may prevent gas reaching the parts of the connector susceptible to rapid gas decompression and may itself withstand the downhole pressure fluctuations.

The present embodiments also provide a downhole cable termination assembly, the assembly including the apparatus according to the first or second alternatives of the first aspect described above, the cable that is to extend downhole from a tubing hanger to electrical equipment and that is engaged with the electrical contact to form the termination, and the insulating portion around the termination.

The assembly may include some or all of the optional features and benefits described herein in relation to the first and second alternatives of the first aspect.

The first aspect also provides a method of manufacturing a downhole cable termination assembly, the method including: providing a cable that is to extend downhole from a tubing hanger to electrical equipment; terminating the conductor of the cable with an electrical contact to form a termination; providing an insulating portion around the termination; sealing between the insulating portion and the outside environment by providing a metallic seal such that when the downhole cable termination assembly is in use the metallic seal seals between the insulating portion and the downhole environment.

The first aspect also provides a method of manufacturing a downhole cable termination assembly, the method including: providing a cable that is to extend downhole from a tubing hanger to electrical equipment; terminating the conductor of the cable with an electrical contact to form a termination; providing an insulating portion around the termination; sealing between the insulating portion and the outside environment by axially compressing a seal such that when the downhole cable termination assembly is in use, the seal that is axially compressed seals between the insulating portion and the downhole environment.

The method may include providing some or all of the features discussed herein in relation to the apparatus of the first and second alternative of the first aspect and the assembly of the first aspect of the assembly.

The discussion below relates to the first aspect in its first alternative and/or its second alternative, as well as the downhole cable termination assembly and the method of manufacturing the assembly.

The electrical contact of the downhole cable termination apparatus is for electrical engagement with a conductor of a cable and may be for electrical engagement with a second conductor, for example, another cable. The electrical contact may be for electrical engagement with a conductor of a connector half such as a pin. The electrical contact may be a conductive sleeve arranged to extend around the end portion of the conductor of the cable and arranged to extend around the end portion of a second conductor, which as mentioned above may be a pin of a connector half. The conductive sleeve may be attached to the conductors by any means that provides good electrical engagement such as being crimped, by a push fit and or being fixed by one or more fixing members such as a screw. When the electrical contact includes a conductive sleeve, the electrical contact may be attached to the conductor by being crimped and is attached to the second conductor, for example a pin, by a plurality of grub screws extending radially through the sleeve into the pin.

The insulating portion that will electrically insulate the termination may be any known insulating means such as an elastomeric sleeve stretched over the termination, a dielectric gel around the termination that may be held in an elastomeric boot and/or a solid elastomeric insulating material around the termination. The insulating portion may be a solid elastomeric material, for example room temperature vulcanized silicone rubber (RTV silicone rubber). If the insulating portion is RTV silicone rubber, the insulating portion may be cast or molded around the termination.

By providing an insulating portion cast around the insulation entrapment of air near the termination may be minimized or eliminated. This may help prevent electrical discharges in connectors with high electric gradients such as high voltage connectors and connectors with an earth near the conductor causing a high electrical stress.

The apparatus may include a retaining ring for axially compressing the seal. The retaining ring that may be arranged to extend around the cable and in use, be located downhole of the seal.

With such an arrangement the retaining ring may be used to exert axial force on to the seal to energize the seal. The retaining ring may be arranged such that, in use, rotation of the retaining ring axially compresses the seal to energize the seal.

The apparatus may include a termination cover for housing at least part of the termination and at least part of the insulating portion.

By providing a termination cover housing at least part of the termination and insulating portion the insulating portion may be shielded from the downhole environment by the termination cover.

The termination cover may be made of a material acting as a barrier to the downhole gases. Additionally, the termination cover may not transmit downhole pressures to the insulating portion housed by the termination cover. The termination cover may be made from a metallic material, such as super duplex steel.

If the termination cover is made of a metal it is not susceptible to rapid gas decompression and it may provide both a gas barrier and a pressure barrier between the downhole environment and the insulating portion. The termination cover may extend circumferentially around the insulation portion. It may provide a chamber therein for the insulating portion, the chamber being isolated from the downhole environment.

In an embodiment, the metallic seal or the seal arranged to be energized by being axially compressed is configured to extend around the cable and, in use, is positioned between the termination cover and the cable.

With such an arrangement the seal may create a seal between the termination cover and the cable to provide a barrier between the downhole environment and the insulating portion.

The metallic seal or the seal arranged to be energized by being axially compressed may engage directly with the cable.

A cable may include a conductive core (e.g., copper) within an insulating sheath (e.g., PEEK), which is inside a protective sheath (e.g., lead), which is inside a steel armor. If the seal engages the steel armor, this may not provide effective sealing as the armor may not itself be a sealed barrier or because the uneven surface of the steel armor prevents an effective seal. In one assembly, the seal engages the protective sheath of the cable. However, if the protective sheath is made of lead, it may be too soft for direct engagement with a metallic seal or the seal arranged to be energized by being axially compressed, because the engagement may damage the cable.

Therefore, the apparatus may include a sleeve arranged to extend around the cable and provides an engagement surface for the seal. With this arrangement, effective sealing may be obtained without damaging the cable. In use, the sleeve may be located downhole of the insulating portion.

If a termination cover is provided the seal may engage between the termination cover and the sleeve. The sleeve may provide a radially outwardly facing engagement surface for the seal, and the termination cover may provide a radially inwardly facing engagement surface for the seal.

The sleeve may be made of metal. The sleeve, seal, and termination cover may provide a barrier between the insulating portion and the downhole environment.

The sleeve may be attached to a lead sheath of the cable. The sleeve may be fixed to the cable by any known means such as mechanical fasteners or adhesive. The sleeve may be attached to the cable by solder. This arrangement means that a leakage path along the surface of the cable under the sleeve may be prevented. Thus such a path from the downhole environment to the insulating portion is closed off. Additionally, soldering the sleeve onto the cable exerts minimal force onto the cable during fixing and therefore minimizes the probability of damaging the cable during manufacture of the downhole assembly.

If a retaining ring is provided for axially compressing the seal, as discussed above, the retaining ring may be threadedly engaged with the sleeve providing an engagement portion for the seal. However, the retaining ring may be threadedly engaged with the termination cover. During manufacture of the downhole assembly, when the retaining ring is rotated it is translated axially to compress and energize the seal. The retaining ring may then stay in position exerting an axial force on the seal to thereby maintain the seal in an energized state.

In an embodiment, the apparatus includes at least one back-up seal, which in use is located downhole of the insulating portion but uphole of the primary seal. The back-up seal may act between the cable and the termination cover. The backup seal may be provided between the sleeve around the cable and the termination cover. There may be a first back-up seal between the cable and the sleeve, and a second back-up seal between the sleeve and the termination cover. The back-up seal may be a second metallic seal, a seal arranged to be energized by axial compression or a seal arranged to be energized by radial compression. The back-up seal may be an elastomeric seal energized by being radially compressed.

In an embodiment, the apparatus includes a conductor support body for housing at least part of the insulating portion and, which, in use, is located uphole of the termination cover.

The conductor support body may house an uphole portion of the insulating portion. By providing a conductor support body housing at least part of the insulating portion the insulating portion may be shielded from the downhole environment by the conductor support body.

The conductor support may be made of a material acting as a barrier to the downhole gases. Additionally, the conductor support body may not transmit downhole pressures to the insulating portion housed in the conductor support body. The conductor support body may be made of a metallic material, such as super duplex steel. If the conductor support is made of a metal it is not susceptible to rapid gas decompression and it may provide both a gas barrier and a pressure barrier between the downhole environment and the insulating portion.

The conductor support body may extend circumferentially around the insulating portion. The insulating portion may be housed partially in the termination cover and partly in the conductor support body. The conductor support body may be arranged to be sealed to the termination cover.

The conductor support body may engage with the uphole end of the termination cover. The apparatus may include a second seal for sealing between the conductor support body and the termination cover.

The second seal may be a metallic seal. The second seal may be arranged to be energized by being axially compressed. The termination cover and the conductor support body may be held together by a plurality of screws that may also provide the energizing force (e.g., axial compression) for the second seal.

By providing a metallic seal between the termination cover and the conductor support body, a path between the downhole environment and the insulating portion may be sealed to prevent gas from the downhole environment reaching the insulating portion housed in the termination cover and the conductor support body to prevent rapid gas decompression affecting the insulating portion. In certain embodiments, the first mentioned seal, the second seal, the termination cover, and the conductor support body are arranged such that together they separate the insulating portion from the downhole environment. All of these components may be formed of a material that is not susceptible to RGD, e.g., steel. Therefore, no RGD susceptible component is exposed to the downhole environment.

In an embodiment, the termination cover and the conductor support body together enclose the insulating portion and are sealed such that the insulating portion is isolated from the downhole environment.

The internal pressure of a chamber may be provided by the termination cover in which the insulating portion is housed is isolated from pressure in the downhole environment, e.g., the chamber is not pressure compensated with the downhole environment. This means that the pressure surrounding the insulating portion will not fluctuate as the downhole pressure fluctuates and as a result rapid gas decompression of the insulating material will not occur when a rapid drop in pressure occurs in the downhole environment, which is an advantage if gas has leaked/permeated into the chamber.

In use at moderate temperatures, e.g., the temperature at the surface before the apparatus is deployed, there may be a cavity between the insulating portion and the termination cover. The termination chamber may define a chamber for the insulating portion, the chamber providing, in use, a cavity between the insulating portion and the termination cover for differential thermal expansion or contraction thereof.

The insulating portion and the termination cover may have different coefficients of thermal expansion. For example, when the insulating portion is made of RTV silicone rubber and the termination cover is made of steel the difference in coefficients of thermal expansion may be an order of magnitude or more. As a result, when the apparatus is subjected to changes in temperature the components will expand by different amounts. Therefore, by providing a cavity between the insulation portion and the termination cover, when the temperature of the apparatus changes the insulating portion has space in which to expand.

The chamber may be arranged to receive oil whereby, in use, the cavity may be filled with oil. This arrangement may avoid the presence of air pockets in the apparatus.

The apparatus may include a compensation means for accommodating volume changes within the chamber due to differential thermal expansions. By providing a compensation means, a pressure buildup in the chamber within the termination cover housing the insulation portion may be prevented. If the buildup of pressure is not compensated for, it may cause damage, for example, to the insulating portion and/or any seals sealing the chamber.

The compensation means may be a flexible boot. The compensation means may be a compensation chamber in fluid communication with the chamber for the insulating portion. The compensation chamber may be fluidly connected to the cavity by a passage extending through the termination cover from the compensation chamber to the chamber for the insulating portion. The compensation chamber may be provided in the termination cover or the conductor support body. The chamber for the insulating portion, the passage, and the compensation chamber may be filled with a pressure transmitting fluid such as oil.

In an embodiment, the compensation chamber may adjust in volume to accommodate changes in volume of the cavity between the insulating portion and the termination cover caused, e.g., by differential thermal expansion of the components of the apparatus and, in particular, by changes in volume of the insulating portion itself. The compensation chamber may contain a piston that may move within the compensation chamber to accommodate volume changes.

A second aspect is concerned with providing a downhole termination apparatus with an improved arrangement for dealing with downhole pressure fluctuations.

Viewed from a second aspect, a downhole cable termination apparatus is provided for terminating a cable, which is to extend into a downhole environment from a tubing hanger to electrical equipment, the apparatus including: an electrical contact for electrical engagement with a conductor of the cable to form a termination, which, in use, is to be electrically insulated by an insulating portion; and a housing defining a chamber for receiving the insulating portion and in which the internal pressure is isolated from pressure in the downhole environment.

By providing an apparatus with a chamber for receiving an insulating portion having an internal pressure isolated from the pressure in the downhole environment, the insulating portion may be protected from the extreme pressures and fluctuating pressures experienced downhole.

As mentioned above, the connectors in the tubing hanger are subjected to hostile conditions such as extreme temperatures and pressures and aggressive chemicals.

The pressure in the downhole environment may fluctuate, for example, due to the operation of an electric submersible pump in the well. This pressure fluctuation may cause a problem for the elastomers having absorbed gas. A rapid drop in pressure results in the gas having permeated the elastomer rapidly expanding. The majority of the expanding gas may be absorbed into the material is unable to diffuse to accommodate the expansion and as a result the gas expansion within the material may damage and tear the material. This effect is known as rapid gas decompression (RGD).

In some prior art systems, there have been attempts to minimize the effect of rapid gas decompression by using elastomers absorbing less gas and/or by constraining the elastomers so as to prevent the gas/elastomer volume from expanding and hence preventing the elastomer from tearing, internal pressure will build up until the gas may diffuse out.

The problem of rapid gas decompression may be overcome or minimized in a more reliable manner by isolating the pressure around the insulating portion (which may be made of an elastomer, e.g., room temperature vulcanizing silicone rubber (RTV silicone rubber)) from the pressure of the downhole environment that fluctuates.

In the second aspect, the insulating portion is received in a chamber isolated from the fluctuating pressure. If the insulating portion is not subjected to fluctuating pressures, the problem of rapid gas decompression (RGD) may be prevented or minimized.

The thickness of the insulating portion around the electrical contact may be between 0.3 and 1 times the diameter of the electrical contact forming the termination, or between 0.4 and 0.6 times the diameter. In an embodiment, the thickness of the insulating portion around the electrical contact is 0.5 of the diameter of the electrical contact forming the termination. The thickness may be at least 0.3 or 0.4 or 0.5 or 0.6 times the diameter.

According to the second aspect, a downhole cable termination assembly is provided, the assembly including the apparatus of the second aspect, a cable that is to extend into a downhole environment from a tubing hanger to electrical equipment, the cable being in electrical engagement with the electrical contact to form the termination, and the insulating portion electrically insulating the termination, wherein the internal pressure of the chamber for receiving the insulating portion is isolated from pressure in the ambient environment such that in use the internal pressure of the chamber is isolated from the pressure in the downhole environment.

The assembly may include some or all of the optional features and benefits described herein in relation to the second aspect.

The second aspect also provides a method of manufacturing a downhole cable termination assembly, the method including: providing a cable that is to extend into a downhole environment from a tubing hanger to electrical equipment; terminating the conductor of the cable with an electrical contact to form a termination; providing an insulating portion around the termination; and housing the insulating portion in a chamber in a housing such that, in use, the internal pressure of the chamber housing the insulating portion is isolated from pressure in the downhole environment.

The method may include providing some or all of the features discussed herein in relation to the apparatus and the assembly of the second aspect.

The discussion below relates to the apparatus in its second aspect, as well as the downhole cable termination assembly and the method of manufacturing the assembly of the second aspect.

The chamber defined by the housing may have the same volume as the insulating portion received in the chamber. However, the housing may be arranged to provide an annular cavity between the insulating portion and the housing. In an embodiment, at moderate temperatures (e.g., room temperature during manufacture of the assembly), the size of the chamber is larger than the size of the insulating portion so that during manufacture when the insulating portion is received in the chamber there is an annular cavity between the insulating portion and the housing.

At room temperature, the volume of the annular cavity may be between 10% and 40% of the total volume of the chamber. In an embodiment, the volume of the annular cavity is 30% of the total volume of the chamber. The volume of the annular cavity may be at least 10% or 20% or 30% of the total volume of the chamber at room temperature.

The housing and the insulating materials may be formed of different materials, for example, the housing may be formed of a metal and the insulating portion may be formed of an elastomer. As a result, the housing and the insulating portion may have different coefficients of thermal expansion. When the insulating portion is formed of an elastomer and the housing is formed of a metal, the difference in differential thermal expansions may be an order of magnitude or more. As a result, when the assembly is subjected to a change in temperature, the volume of the insulating portion may change significantly more than the housing. If there is no space for the insulating portion to expand into when the temperature rises, a pressure buildup may occur in the housing. This pressure may cause damage to the parts contained within the housing and/or any seals isolating the chamber from the downhole environment. This pressure builds up may be minimized by providing an annular cavity to provide space for the insulating portion to expand into.

The apparatus may include a compensation means for accommodating changes of volume of the annular cavity within the chamber due to differential thermal expansions and contractions. By providing a compensation means, a pressure buildup in the chamber within the housing that houses the insulation portion, for example, due to differential thermal expansion, may be prevented. If the buildup of pressure is not compensated, it may cause damage to the insulating portion and any seals sealing the chamber.

The compensation means may be a flexible boot. The compensation means may be a compensation chamber in fluid communication with the chamber for the insulating portion. The compensation chamber may be fluidly connected to the cavity by a passage extending through the housing from the compensation chamber to the chamber for the insulating portion. The compensation chamber may be provided in the housing as this may allow the assembly to be more compact. The chamber for the insulating portion, the passage, and the compensation chamber may be filled with a pressure transmitting fluid such as oil. This arrangement may avoid the presence of air pockets in the apparatus that may cause electrical discharges if the electrical gradient in the assembly is high enough.

In an embodiment, the compensation chamber may adjust in volume to accommodate changes in volume of the cavity between the insulating portion and the termination cover. The compensation chamber may contain a compensator piston that may move within the compensation chamber to accommodate volume changes caused, e.g., by differential thermal expansion of the components of the apparatus.

The compensator piston may be biased by a spring. This arrangement keeps the oil in the annular cavity, passage, and compensator piston under pressure.

The housing may be made of a rigid material. If the housing is made of a sufficiently rigid material, it will not transmit pressure changes from the downhole environment to a cavity within the housing and therefore may isolate the pressure of the chamber in the housing from the pressure on the outside of the housing. If the housing is made of a rigid material, it may be directly in contact with the downhole fluctuating pressures whilst isolating the pressure of the chamber inside the housing from the downhole environment. In other words, the chamber inside the housing may be prevented from being pressure balanced.

The housing may be made of a sufficiently strong material so that it is able to withstand crush pressures that may occur due to the chamber inside the housing that is not pressure balanced.

The housing may be made of a material acting as a gas barrier and resistant to RGD. This will prevent the housing being damaged and thus reduce the chance of the chamber not being isolated from the downhole environment and prevent the gases from downhole coming into contact with the insulating portion housed in the chamber in the housing.

In an embodiment, the housing is made from a metallic material such as steel. This means that the housing is a gas barrier and is sufficiently rigid, strong, and resilient to RGD to have the benefits discussed above.

The housing may be made from a single component sealed around the insulating portion. However, the housing may be made from a plurality of components. When the housing includes a plurality of components, it may make manufacture of the assembly easier. The housing may not include too many components as this will increase the number of possible leakage paths from the downhole environment to the chamber inside the housing that receives the insulating portion.

The housing may include a termination cover for housing at least part of the termination and at least part of the insulating portion. The housing may also include a conductor support body for housing at least part of the insulating portion and, which in use is located uphole of the termination cover. Together, the termination cover and the conductor support body may form the housing.

By providing a termination cover housing, at least part of the termination and insulating portion the insulating portion may be shielded from the downhole environment by the termination cover. The termination cover may extend circumferentially around the insulation portion to provide the chamber therein for the insulating portion and the conductor support body extends circumferentially around the part of the insulation portion not housed in the termination cover.

By providing a conductor support body housing, at least part of the insulating portion the insulating portion may be shielded from the downhole environment by the conductor support body.

The insulating portion may be housed partly in the termination cover and partly in the conductor support body. The conductor support body may be arranged to be sealed to the termination cover. Such an arrangement allows the chamber in the conductor support body and the termination cover to be sealed from the downhole environment.

The conductor support body may engage with the uphole end of the termination cover. The conductor support body may define a socket for receiving an end of the termination cover.

The apparatus may include a seal for sealing between the conductor support body and the termination cover. By providing a seal between the termination cover and the conductor support body, a path between the downhole environment and the insulating portion may be sealed to prevent gas from the downhole environment reaching the insulating portion housed in the termination cover and the conductor support body. This may help isolate the chamber inside the housing from the downhole environment and may help prevent rapid gas decompression affecting the insulating portion.

When the conductor support body defines a socket receiving an end of the termination cover and the apparatus includes a seal for sealing between the two parts, a reliable sealing barrier may be formed.

The seal may be a metallic seal arranged to be energized by being axially compressed. The seal may be a metallic seal or it may be made from a material other than metal such as a polymeric material, or it may be metal and other material composite. The seal may be made from a material that is not susceptible to rapid gas decompression. By using a seal resistant to rapid gas decompression to seal the insulating portion from the downhole environment, the seal may prevent gas reaching the parts of the connector susceptible to rapid gas decompression and may itself withstand the downhole pressure fluctuations.

The termination cover and the conductor support body defining the housing may be held together by a plurality of screws. When the seal is a metallic seal arranged to be energized by being axially compressed, the screws may provide that the seal between the two components remains energized during use.

The apparatus may include a plurality of electrical contacts for a plurality of cable conductors to form a plurality of terminations, each of which, in use, is to be electrically insulated by an insulating portion, the housing defining a respective chamber for each of the insulating portions. With such an arrangement, the assembly may carry a plurality of different phases of power. The plurality may be three so that the assembly may carry three phase power. In that case, the housing may define three chambers.

In the assembly including a plurality of terminations, a single housing may provide the plurality of respective chambers. This arrangement reduces the number of component parts and may reduce the complexity of manufacturing the assembly. It also allows the assembly to be more space efficient.

In the arrangement in which the plurality of chambers is provided by a single housing including a termination cover and conductor support body, the seal between the termination cover and the conductor support body may extend circumferentially around all of the plurality of chambers.

Additionally, when the plurality of chambers is provided by a single housing they may be pressure compensated by a single compensation means such as a single compensation chamber. However, each chamber may have its own respective compensation means. Each chamber does not then need to be in pressure communication with each other chamber. Also, each pressure compensation means may be smaller so that the arrangement may be more compact as the plurality of compensation means may fit in spaces between each of the chambers. Alternatively, each chamber may not be completely sealed individually but there may be limited fluid communication, e.g., by use of a labyrinth seal, between the chambers. This option means that the size may be minimized whilst still providing increased robustness as the system may work with one phase shorted to earth, e.g., when there is a leak into one of the chambers.

During manufacture the insulating portion is cast or molded around the termination.

Casting the insulating portion around the termination means that intimate contact between the insulation and conductor may be achieved to minimize entrapment of air near the termination. In the SpecTRON 5 system discussed above, the termination is covered by an elastomeric termination sleeve stretched over the end of the cable and connector pin. Such an arrangement has a chance of trapping air around the termination. This may not be a problem in this system because it operates with lower electrical stress at this interface as a result of the lower operating voltage and greater separation between live and earth. However, the termination is received in a chamber defined by a housing. The housing may be earthed and relatively close to the termination. As a result, the electrical stress may be relatively high and thus air around the termination may be eliminated to prevent electrical discharges.

When casting the insulating portion, the insulating portion may be cast in a temporary mold rather than directly into the housing. This means that the volume of the molded insulating portion may be formed to be smaller than the volume of the chamber in the housing such that an annular cavity between the insulating portion and the housing may be formed as discussed above.

A third aspect is concerned with providing a downhole termination apparatus with an improved arrangement for providing seal engagement portions.

Viewed from a third aspect, a downhole cable termination apparatus is provided for terminating a cable that is to extend downhole from a tubing hanger to electrical equipment, the apparatus including: a first seal for sealing the apparatus uphole of the first seal from the downhole environment; a second seal for sealing the apparatus uphole of the second seal from the downhole environment; and a sleeve arranged to extend around the cable and to be attached to the cable, the sleeve being for providing a radially outwardly facing engagement portion for the first seal and a radially inwardly facing engagement portion for the second seal, the sleeve having two parts, a first part being arranged to be attached to the cable and providing the radially outwardly facing engagement portion, and a second part providing the radially inwardly facing engagement portion and provided separately from the first part, and the sleeve being arranged such that when the apparatus is assembled on the cable the second part is joined to the first part.

By providing an arrangement in which a first part of a sleeve to be attached to the cable is separate from a second part of the sleeve providing the radially inwardly facing engagement portion, the seals do not have to be close to the first part when it is being attached to the cable.

In an embodiment, during manufacture the second seal needs to be placed adjacent to the radially inwardly facing engagement portion of the second part of the sleeve before the second part of the sleeve is fed onto the cable to be positioned around the cable.

By providing a sleeve in which the part attached to the cable is separate from the part of the sleeve providing the radially inwardly facing seal engagement portion, the first part of the sleeve may be attached to the cable without risk of the attaching step damaging the second seal that is to contact the radially inwardly facing engagement portion. Therefore, according to the third aspect, the part of the sleeve providing the radially inwardly facing seal engagement portion (e.g., the second part) is separate from the first part of the sleeve arranged to be attached to the cable.

With such an arrangement, the second part of the sleeve with the second seal located radially inwardly when the sleeve is arranged around the cable may be held at a location sufficiently far from the first part of the sleeve whilst it is being attached to the cable to prevent the attaching operation damaging the second seal.

The first seal arranged to be in contact with the radially outwardly facing engagement portion of the first part of the sleeve may be located in contact with the radially outwardly facing portion after the first part of the sleeve has been attached to the cable. Again, this means that the first part of the sleeve may be attached to the cable without damaging the first seal.

The third aspect also provides a downhole cable termination assembly, the assembly including the apparatus according to the above described third aspect and the cable arranged to extend downhole from a tubing hanger to electrical equipment.

The assembly may include some or all of the optional features and benefits described herein in relation to the apparatus of the third aspect.

The third aspect also provides a method of manufacturing a downhole cable termination assembly, the method including: providing a cable that is to extend downhole from a tubing hanger to electrical equipment; providing a first seal for sealing the apparatus uphole of the first seal from the downhole environment; providing a second seal for sealing the apparatus uphole of the second seal from the downhole environment; providing a sleeve arranged to extend around the cable and to be attached to the cable, the sleeve being for providing a radially outwardly facing engagement portion for the first seal and a radially inwardly facing engagement portion for the second seal, the sleeve having two parts, a first part being arranged to be attached to the cable and providing the radially outwardly facing engagement portion, and a second part providing the radially inwardly facing engagement portion and provided separately from the first part, and the sleeve being arranged such that when the apparatus is assembled on the cable the second part is joined to the first part; attaching the first part of the sleeve to the cable; and joining the second part of the sleeve to the first part of the sleeve.

The method may include providing some or all of the features discussed herein in relation to the apparatus and/or the assembly of the third aspect.

The discussion below relates to the third aspect, as well as the downhole cable termination assembly and the method of manufacturing the assembly of the third aspect.

The sleeve may be fixed to the cable by any known means such as mechanical fasteners or adhesive. In an embodiment, the first part of the sleeve is arranged to be attached to the cable by solder and, for the method of manufacturing, the assembly may include soldering the first part of the sleeve to the cable.

When the first part of the sleeve is attached to the cable by solder, a leakage path along the surface of the cable under the sleeve may be prevented. Thus, a path from the downhole environment to the insulating portion is sealed off. Additionally, soldering the sleeve onto the cable exerts minimal force onto the cable during the attaching operation and therefore minimizes the probability of damaging the cable during manufacture of the downhole assembly.

In order to attach the sleeve to the cable by solder, the solder and the surrounding area need to be heated to a high enough temperature to melt the solder. For example, the solder may be heated to a temperature of up to 260° C. by a heat gun and a diffuser extending at least partly around the outside of the first part of the sleeve located around the cable. The seals of the apparatus may be damaged if they are subjected to these high temperatures. As discussed above, the two-part sleeve allows the seals to be located remote from the first part of the sleeve whilst it is being attached to the cable so that they are not damaged by the high temperatures.

The first part of the sleeve may have an opening extending radially through the sleeve. Such an opening provides a path for applying the fixing means to attach the sleeve to the cable. For example, when the sleeve is attached to the cable by solder, solder paste and/or molten solder wire may be inserted through the opening to allow the sleeve to be soldered to the cable.

In an embodiment, the first part of the sleeve is provided with a circumferential cavity in the radially inward surface of the first part of the sleeve. The circumferential cavity may extend around the full circumference of the sleeve. During manufacture, the circumferential cavity may be filed with adhesive or solder paste to attach the sleeve to the cable. By providing the circumferential cavity, the fixing means may be applied to the inside of the sleeve before it is located around the cable. Additionally, when the cavity extends around the entire circumference of the sleeve it allows the fixing means to extend around the entire circumference of the cable to provide a continuous seal. The cavity provides a space for sufficient fixing means to be held to provide that the attachment between the sleeve and the cable is reliable.

When the sleeve is provided with an opening extending radially through the sleeve and a circumferential cavity on the radially inwardly surface, the opening may extend through the sleeve into the circumferential cavity. This means when the sleeve is attached to the cable, the fixing means, e.g., solder, may be pre-filled in the cavity and/or added to the cavity during the attaching operation though the window to provide that the cavity is filled with the fixing means and that no air bubbles are formed in the cavity. This helps provide that the sleeve is securely fixed to the cable and that a continuous seal is provided around the entire circumference of the cable within the sleeve to provide a reliable seal.

The cable may include a conductive core (e.g., copper) within an insulating sheath (e.g., PEEK), which is inside a protective sheath (e.g., lead), which is inside a steel armor. With such a cable, the first part of the sleeve may be located around and in contact with the protective sheath of the cable and the second part of the sleeve to be located around and in contact with the insulating sheath of the cable. In an assembly, the first part of the sleeve may be attached to the protective sheath of the cable, for example, by solder and the second part of the sleeve extends around the insulating sheath of the cable and is joined to the first part of the sleeve.

The minimum inner diameter of the first part of the sleeve may be greater than the minimum inner diameter of the second part of the sleeve. The minimum inner diameter of the first part of the sleeve may be approximately the same as the outer diameter of the protective sheath to provide a good contact between the first part and the protective sheath when the first part is located around the protective sheath. The minimum inner diameter of the second part of the sheath may be approximately the same as the outer diameter as the insulating sheath of the cable to provide a good contact between the second part and the insulating sheath when the second part is located around the insulating sheath.

When the second part of the sleeve has a minimum inner diameter that is approximately the same as the outer diameter of the insulating sheath around which it extends, the radially inwardly facing engagement portion for the second seal may be provided as a circumferential groove so that there is space between the cable and sleeve for the second seal. The depth of the groove may be smaller than the height (or cross sectional diameter, if round) of the second seal so that when the second seal is positioned between the sleeve and the cable it is radially compressed to energize the seal.

In an embodiment, the second part of the sleeve also provides a radially outwardly facing engagement portion for engagement with one or more seals, which in use acts as a back-up seal for the first seal.

An end portion of the first part of the sleeve may be arranged to extend circumferentially around an end portion of the second part of the sleeve.

With such an arrangement the join between the first part of the sleeve and the second part of the sleeve may be made between the end portion of the first part of the sleeve extending circumferentially around an end portion of the second part of the sleeve. The join may be formed between a radial inwardly facing surface of the first part of the sleeve and a radial outwardly facing surface of the second part of the sleeve.

The join between the first part of the sleeve and the second part of the sleeve may be fixed by any known means such as adhesive or mechanical fasters. The second part of the sleeve may be attached to the first part of the sleeve by being threadedly engaged therewith. By joining the second part of the sleeve to the first part of the sleeve by threaded engagement the joining of the two parts may be achieved easily during manufacture. Additionally, joining the two parts by threaded engagement reduces the risk of damaging seals located near the join during the joining process.

In an embodiment of the assembly, an end face at a downhole end portion of the second part of the sleeve is in contact with the protective sheath of the cable to which the first portion is attached. When the second part of the sleeve is arranged to abut the end of the protective sheath to which the first part of the sleeve is attached, gaps between the sleeve and the cable may be minimized. This may help prevent air being trapped around the cable that may cause electrical discharges if the electrical gradient around the cable is high enough. This also allows the earth profile provided by the protective sheath of the cable to be continued and to allow the earth to be ended with a smooth, rounded profile that minimizes local electrical stress.

During manufacture of the assembly, the first part of the sleeve attached to the cable may be held in an oil bath when the second part of the sleeve is joined to the first part of the sleeve.

With this method, air may be removed from around the first part of the sleeve before the second part is joined. The second part of the sleeve may be joined to the first part of the sleeve under oil so that no air is trapped between the two parts when they are joined together. This may minimize air that it trapped between the two components that may reduce the problem of electrical discharges mentioned above.

BRIEF DESCRIPTION OF THE DRAWINGS

Each of the three aspects described above may be provided in combination with one or both of the other aspects. The embodiment described below embodies the three aspects in combination. The described embodiment is described, by way of example only, and with reference to the accompanying drawings, in which:

FIG. 2 is shows an enlarged portion of the assembly of FIG. 1.

DETAILED DESCRIPTION

Figure 1:
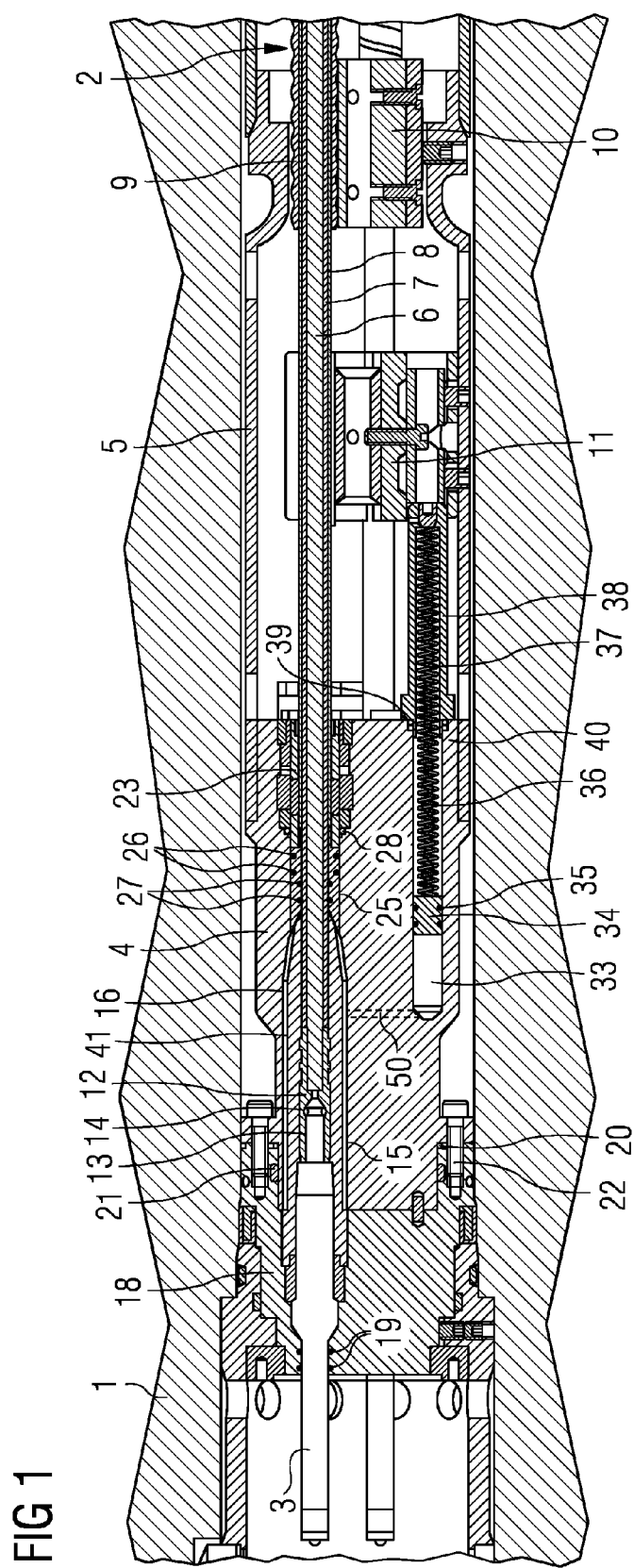
FIG. 1 shows an example of a downhole cable termination assembly.

Referring to FIG. 1, this shows a downhole cable termination assembly in a tubing hanger 1. A termination is made between a cable 2 and a pin 3 of a connector half arranged to be connected to another connector half to form a connector. The cable 2 extends downhole from the termination through a termination cover 4 and a tubing hanger receptacle gland housing 5 to electrical equipment such as an electric submersible pump. There may be three cables within the termination apparatus, each of which is terminated to a pin 3 of the connector half. The arrangement shown in FIG. 1 has three cables, although the cross section is only through one of the cables and its compensation chamber (discussed below).

The cable 2 includes a conductive copper core 6 within an insulating polyether ether ketone (PEEK) sheath 7, which is within a lead sheath 8, which is within a steel armor 9. Each layer of the cable 2 is concentric with the others. At a downhole portion of the tubing hanger receptacle gland housing 5, the cable is held in a cable grip 10. The cable grip 10 engages with the steel armor 9 of the cable 2 and holds the cable 2 in position within the tubing hanger receptacle gland housing 5. The cable grip 10 engages with the steel armor of all the cables in the assembly. Also, within the tubing hanger receptacle gland housing 5, uphole of the cable grip 10 is a cable support 11 engaging with the lead sheath 8 of the cable 2. Again, the cable support 11 engages with the lead sheath of all the cables in the assembly.

The copper core 6 of the cable 2 is terminated to the pin 3 by a contact terminal 12. The pin 3 is in contact with a multilam 13 within the contact terminal 12 and held therein by a plurality of grub screws 14 extending radially through the contact terminal 12 into the pin 3.

The termination including the end portion of the conductive core 6 of the cable 2, the end portion of the pin 3, the contact terminal 12 and the multilam 13 is encapsulated in a solid insulating portion 15 that has been cast around the termination. The insulating portion may be formed of room temperature vulcanizing silicone rubber (RTV) but may be made of any other electrical insulating material.

The cast insulating portion that encapsulates the termination is housed within a chamber 16 provided by a metal housing. The metal housing provides a chamber 16 for each insulated termination. The metal housing includes the termination cover 4 and an electrical contact support body 18. The chamber 16 for housing the insulating portion 15 is partly provided by the termination cover 4 and partly provided by the electrical contact support body 18.

The pin 3 extends from the connector half through the electrical contact support body 18 to the termination in the part of the chamber 16 provided by the termination cover 4. The electrical contact support body 18 is sealed to the pin 3 by two O-rings 19. The electrical contact support body 18 is sealed to the termination cover 4 by a metallic seal 20 energized by axial compression and by a backup elastomeric seal 21. The electrical contact support body has a recess for receiving an end portion of the termination cover 4. The metallic seal 20 provides a seal between an end face of the electrical contact support body 18 and a radially extending flange of the termination cover 4. The backup elastomeric seal 21 provides a seal between a radial outer surface of the termination cover 4 and a radial inward surface of the electrical contact support body 18. The seal 20 extends around all of the chambers provided within the metal housing. The electrical contact support body 18 is attached to the termination cover 4 by a plurality of screws 22 extending through the radially extending flange of the termination cover 4 into the electrical contact support body 18 to hold the two components together and to maintain the seal between the two components.

The termination cover 4 is sealed to the cable by a sealing arrangement shown in greater detail in FIG. 2. This sealing arrangement is provided for each cable in the assembly. As may be seen more clearly in FIG. 2, attached to the lead sheath 8 of the cable 2 is a solder sleeve 23. The solder sleeve 23 is attached to the lead sheath 8 by solder 24. The solder sleeve includes a solder fill window 42 extending radially through the solder sleeve to a circumferential cavity 43 on the radial inward face of the solder sleeve 23. The circumferential cavity 43 and the window 42 are filled with solder 24 to attach the solder sleeve 23 to the lead sheath of the cable. The inner diameter of the solder sleeve 23, except the circumferential cavity 43 is substantially the same as the outer diameter of the lead sheath so that the sleeve is in direct engagement with the lead sheath of the cable.

The sealing arrangement also includes a seal carrier 25. The seal carrier 25 carries two pairs of O-rings 26, 27 in which one pair 26 is located radially outwardly of the seal carrier 25 and the other pair 27 is located radially inwardly of the seal carrier 25. The O-ring pair 26 radially outwardly of the seal carrier provide a seal between the termination cover 4 and the seal carrier 25 and the O-ring 27 pair radially inwardly of the seal carrier provides a seal between the PEEK sheath 7 of the cable 3 and the seal carrier 25. The seal carrier 25 extends around the PEEK sheath 7 of the cable 3 and extends from a downhole end of the insulating portion 15 to the end face of the lead sheath 8. The inner diameter of the seal carrier is substantially the same as the outer diameter of the PEEK sheath such that the seal carrier direct engages with the PEEK sheath. The minimum inner diameter of the solder sleeve 23 is greater than the minimum inner diameter of the seal carrier 25.

Together, the solder sleeve 23 and the seal carrier 25 provide a sleeve extending around the cable. The sleeve provides a radially outwardly facing engagement portion for a metallic seal 28 and a radially inwardly facing engagement portion for the O-ring pair 27. The sleeve includes the two parts, the solder sleeve 23 (e.g., a first part), which attached to the cable 2 and provides the radially outwardly facing engagement portion for the metallic seal 28, and the seal carrier 25 (e.g., a second part), which provides the radially inwardly facing engagement portion and is provided separately from the solder sleeve. The solder sleeve 23 and the seal carrier 25 are joined together during manufacture after the solder sleeve 23 has been attached to the lead sheath of the cable by solder.

A downhole portion of the seal carrier 25 extends radially inwardly of an uphole portion of the solder sleeve 23 and these two parts are threadedly engaged. When the two parts are joined together, their outer diameters are substantially the same.

During manufacture, when the seal carrier 25 is joined to the solder sleeve 23 by threaded engagement the solder sleeve and the surrounding cable are held in an oil bath. This prevents air being trapped at the end of the lead sheath where there may be a high electrical stress.

The solder sleeve 23 provides an engagement surface for the metallic seal 28, which is energized by being compressed axially. The metallic seal 28 when energized creates a seal between the solder sleeve 23 and the termination cover 4.

Radially outwardly of the cable 2 and solder sleeve 23 but radially inwardly of the termination cover 4 in a downhole sequence are a compression ring 29, a termination cover retaining ring 30, a solder sleeve retaining ring 31, and a termination locking ring 32. The compression ring 29 extends between the metallic seal 28 and the termination cover retaining ring 30 and acts as a thrust washer between the metallic seal 28 and the termination cover retaining ring 30. The termination cover retaining ring 30 extends between the compression ring 29 and the solder sleeve retaining ring 31 and is threadedly engaged with the termination cover 4. During manufacture of the assembly, rotation of the termination cover retaining ring 30, axially compresses the metallic seal 28 by the compression ring 29 to energize the seal. The solder sleeve retaining ring 31 extends between the termination cover retaining ring 30 and the termination locking ring 32 and is threadedly engaged with the solder sleeve 23. The termination locking ring 32 extends from the solder sleeve retaining ring 31 to the end of the termination cover 4. The termination locking ring 32 is threadedly engaged with the termination cover 4 and in the assembly is flush with the end of the termination cover 4. The described arrangement of the retaining ring 30, the solder sleeve retaining ring 31, and the termination locking ring 32 is provided to keep the metallic seal 28 energized and to prevent movement of the solder sleeve 23 during use.

As shown in FIG. 1, the termination cover 4 also provides a compensation chamber 33 in fluid communication with the chamber 16 provided in the termination cover 4 by a passage 50. Each chamber is provided with a respective compensation chamber.

Within the compensation chamber 33 is a compensation piston 34 holding a pair of O-ring seals 35, which engages between the piston 35 and the walls of the compensation chamber 33 (the termination chamber 4). The piston 35 has a rod 36 extending downhole in a spring 37 held between the piston 34 and the bottom of a compensator spring extension tube 38. The compensator spring extension tube 38 extends partly into a recess provided in the downhole face of the termination cover 4 and is clamped in position by two screws (not shown) and threadedly engaged with the termination cover 4 to close the compensation chamber 33. The compensator spring extension tube 38 is sealed to the termination cover 4 by a metallic C seal 39 and an O-ring 40. The metallic C seal 39 is located between the end face of the termination cover 4 and a radially extending flange of the compensator spring extension tube and the O-ring 40 is provided within the recess in the termination cover housing and provides a seal between a radially outwardly facing surface of the compensator spring extension tube 38 and a radially inwardly facing surface of the termination cover 4.

The chamber 16 within the termination cover 4 housing the insulating portion 15 has, at moderate temperatures, a larger volume than the insulating portion 15. As a result, as shown in FIG. 1, there is an annular cavity 41 between the termination cover 4 and the insulating portion 15 extending circumferentially around the insulating portion within the termination cover 4. The annular cavity 41 within the termination cover 4, the passage, and the compensator chamber 33 uphole of the piston 34 are filled with a pressure transmitting medium such as oil. When the assembly is subjected to temperature changes, due to the differences in the thermal coefficient of expansion between the insulating portion 15 and the termination cover 4, the insulating portion 15 changes in volume more than the termination cover 4. As a result of this differential thermal expansion the annular cavity 41 between the insulating portion 15 and the termination cover 4 changes in volume and this change in volume is accommodated by movement of the piston 34 in the compensation chamber 33. This means that a buildup of pressure between the insulating portion 15 and the termination cover 4 due to temperature changes may be minimized and/or prevented.

As shown in the Figures and described above, each path from the downhole environment to the insulating portion 15 is sealed by a metallic seal and at least one elastomeric back-up seal. In other words, all the primary seals between the insulating portion 15 and the downhole environment are seals that are not susceptible to damage by rapid gas decompression. The metallic seals isolate the internals of the connector from gas of the downhole environment and fluctuating pressures so the problem of rapid gas decompression is reduced and/or prevented. There are four leakage paths shown in the assembly of FIG. 1 that are sealed in this manner. The first path is the path over the solder sleeve 23 and the seal carrier 25 sealed by a primary metallic seal 28 between the solder sleeve 23 and the termination cover 4 and the pair of back up O-rings 26, which seal between the seal carrier 25 and the termination cover 4. The second path is the path under the solder sleeve 23 and the seal carrier 25 along the outer surface of the cable 2, which is sealed by solder 24 attaching the solder sleeve 23 to the lead sheath 7 of the cable 3 and the pair of radially inner O-rings 27 that seal between the seal carrier 25 and the PEEK sheath 7. The third path is the path between the termination cover 4 and the compensator spring extension tube 38 that leads from the downhole environment to the compensation chamber 33. The third path is sealed by a metallic C seal 39 between the termination cover 4 and the compensator spring extension tube 38 as a metallic primary seal and a first back up elastomeric seal 40 between the compensator spring extension tube 38 and the termination cover 4 and a pair of O-rings 35 between the piston 34 and the termination cover 4. The final path, which is the join between the termination cover 4 and the electrical contact support body 18, is sealed by a primary metallic seal 20 and a backup elastomeric seal 21.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A downhole cable termination apparatus for terminating a cable that is to extend into a downhole environment from a tubing hanger to electrical equipment, the downhole cable termination apparatus comprising:
   an electrical contact for electrical engagement with a conductor of the cable to form a termination, the termination, in use, being electrically insulated by an insulating portion;
   a housing defining a chamber for receiving the insulating portion and in which an internal pressure is isolated from pressure in the downhole environment, wherein the housing is arranged to provide an annular cavity between the insulating portion and the housing; and
   a compensation chamber for accommodating changes of a volume of the annular cavity, the compensation chamber being in fluid communication with the chamber for receiving the insulating portion, the compensation chamber being comprised in the housing.

2. The apparatus of claim 1, further comprising a compensator piston that is located in the compensation chamber.

3. The apparatus of claim 2, wherein the compensator piston is biased by means of a spring.

4. The apparatus of claim 1, wherein the housing is made from a metal.

5. The apparatus of claim 1, wherein the housing comprises a termination cover for housing at least part of the termination and at least part of the insulating portion.

6. The apparatus of claim 5, wherein the housing comprises a conductor support body for housing at least part of the insulating portion and, in use, is located uphole of the termination cover.

7. The apparatus of claim 6, wherein the conductor support body defines a socket for receiving an end of the termination cover.

8. The apparatus of claim 6, further comprising a seal for sealing between the conductor support body and the termination cover.

9. The apparatus of claim 8, wherein the seal is a metallic seal.

10. The apparatus of claim 8, wherein the seal is arranged to be energized by being axially compressed.

11. The apparatus of claim 8, further comprising a plurality of electrical contacts for a plurality of cable conductors to form a plurality of terminations, each termination of the plurality of terminations, in use, being electrically insulated by an insulating portion, the housing defining a respective chamber for each of the insulating portions.

12. The apparatus of claim 11, wherein the seal is arranged to extend circumferentially around the plurality of chambers.

13. The apparatus of claim 11, wherein each chamber is in fluid communication with a separate compensation chamber.

14. A method of manufacturing a downhole termination assembly, the method comprising:
   providing a cable that is to extend into a downhole environment from a tubing hanger to electrical equipment;
   terminating a conductor of the cable with an electrical contact to form a termination;
   providing an insulating portion around the termination;
   housing the insulating portion in a chamber in a housing such that, in use, an internal pressure of the chamber housing the insulating portion is isolated from pressure in the downhole environment, wherein the housing is arranged to provide an annular cavity between the insulating portion and the housing; and
   providing a compensation chamber for accommodating changes of a volume of the annular cavity, the compensation chamber being in fluid communication with the chamber for receiving the insulating portion, the compensation chamber being comprised in the housing.

15. The method of claim 14, wherein the providing of the insulating portion comprises casting the insulating portion around the termination.

16. A downhole cable termination assembly comprising:
   a downhole cable termination apparatus for terminating a cable that is to extend into a downhole environment from a tubing hanger to electrical equipment, the downhole cable termination apparatus comprising an electrical contact, a housing, and a compensation chamber, the electrical contact being for electrical engagement with a conductor of the cable to form a termination, the termination, in use, being electrically insulated by an insulating portion, the housing defining a chamber for receiving the insulating portion, wherein the housing is arranged to provide an annular cavity between the insulating portion and the housing, the compensation chamber being for accommodating changes of a volume of the annular cavity, the compensation chamber being in fluid communication with the chamber for receiving the insulating portion, the compensation chamber being comprised in the housing;

the cable being in electrical engagement with the electrical contact to form the termination; and the insulating portion electrically insulating the termination, wherein an internal pressure of the chamber for receiving the insulating portion is isolated from pressure in an ambient environment such that in use the internal pressure of the chamber is isolated from pressure in the downhole environment.

17. The assembly of 16, further comprising oil that is in the chamber for receiving the insulating portion.

18. The assembly of claim 16, wherein the insulating portion is cast around the termination.

* * * * *